United States Patent [19]

Moeller

[11] 4,103,798
[45] Aug. 1, 1978

[54] COMBINATION CAP

[75] Inventor: Richard H. Moeller, Arlington Heights, Ill.

[73] Assignee: G. M. Tool Corporation, Elk Grove Village, Ill.

[21] Appl. No.: 808,109

[22] Filed: Jun. 20, 1977

[51] Int. Cl.² .............................................. B65D 51/00
[52] U.S. Cl. ................................... 215/305; 215/200; 215/321; 215/329
[58] Field of Search ............... 215/200, 228, 316, 317, 215/321, 319, 329, 305, 100 R; D9/281, 287, 288

[56] References Cited

U.S. PATENT DOCUMENTS

| D. 233,138 | 10/1974 | Vogel | D9/287 |
|---|---|---|---|
| 2,884,148 | 4/1959 | Schneider | 215/329 X |
| 2,914,206 | 11/1959 | Lowen | 215/329 X |
| 3,079,022 | 2/1963 | Tompkins | 215/329 X |
| 3,371,814 | 3/1968 | Ruprecht | 215/321 X |
| 3,381,838 | 5/1968 | McClain | 215/321 X |
| 3,869,057 | 3/1975 | Miller | 215/317 X |
| 3,881,627 | 5/1975 | Davolt | 215/329 |

FOREIGN PATENT DOCUMENTS

| 536,007 | 3/1955 | Belgium | 215/321 |
|---|---|---|---|
| 1,347,236 | 11/1963 | France | 215/321 |
| 1,447,795 | 6/1966 | France | 215/321 |
| 665,779 | 1/1952 | United Kingdom | 215/329 |

Primary Examiner—Donald F. Norton
Attorney, Agent, or Firm—Charles L. Lovercheck

[57] ABSTRACT

A combination cap to recap containers of the "snap-on" or "threaded" type which have been opened, partially consumed, and were provided with non-reusable caps by the packager.

1 Claim, 3 Drawing Figures

COMBINATION CAP

GENERAL STATEMENT OF THE INVENTION

The present invention relates to caps for containers to be used by consumers to replace non-reusable caps when the product contained in the container is not completely consumed in order to preserve the product in a usable condition. The combination cap has two separate engaging surfaces and, thus, will accommodate two different sizes or types of closures.

OBJECTS OF THE INVENTION

It is an object of this invention to provide an improved cap for recapping containers provided with non-reusable caps in order to preserve unconsumed products in a usable condition.

Another object of this invention is to provide a cap that will close more than one size or type of container.

Another object of this invention is to provide an improved cap that is simple in construction, economical to manufacture, and easy and convenient to use.

With the above and other objects in view, the present invention consists of the combination and arrangement of parts hereinafter more fully described, illustrated in the accompanying drawing and more particularly pointed out in the appended claims, it being understood that changes may be made in the form, size, proportions and minor details of construction without departing from the spirit or sacrificing any of the advantages of the invention.

GENERAL DESCRIPTION OF THE DRAWINGS

DETAILED DESCRIPTION OF THE DRAWINGS

Figure 1:
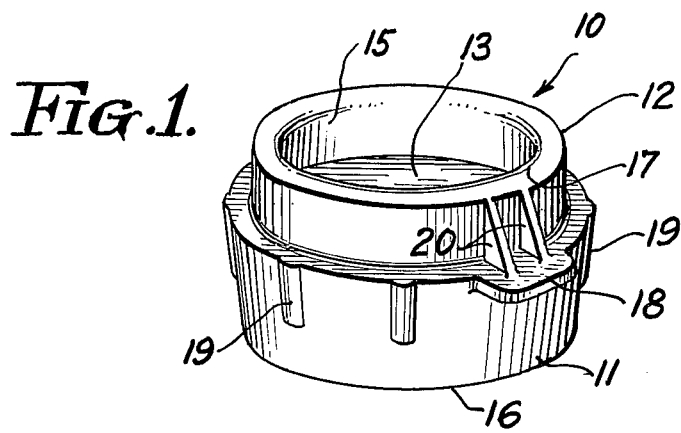
FIG. 1 is an isometric view of the combination cap.
Figure 2:
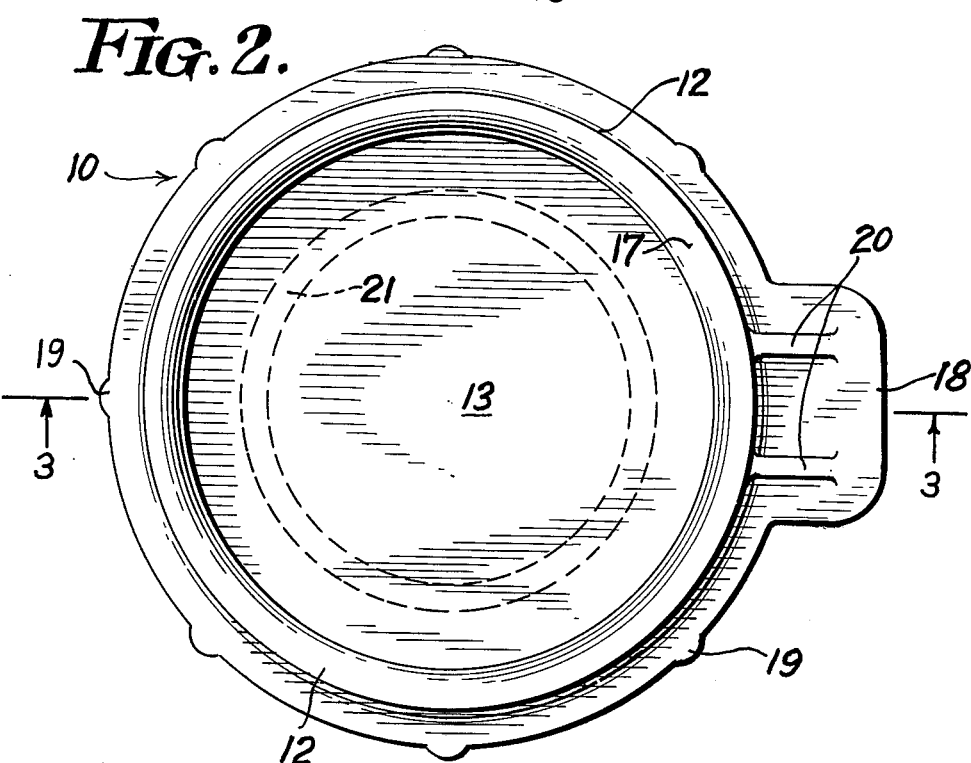
FIG. 2 is an end view of the cap according to the invention.
Figure 3:
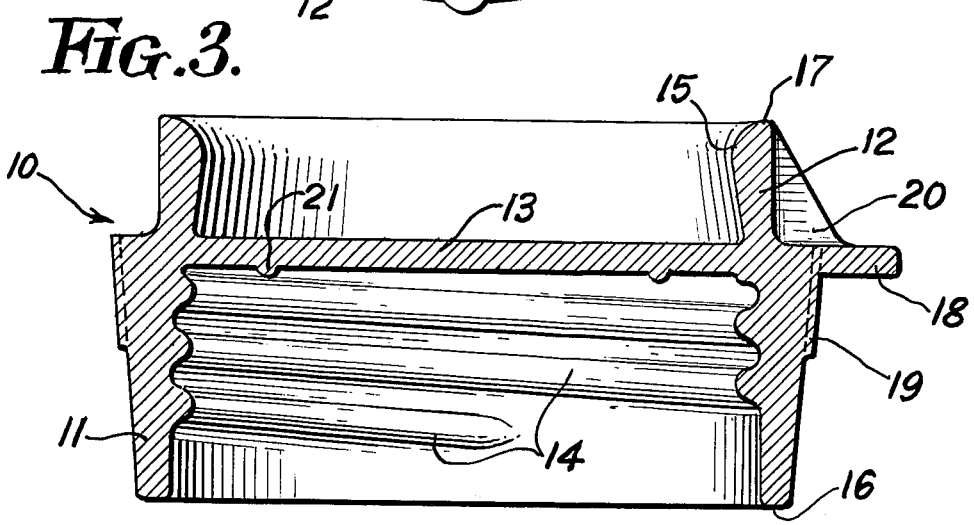
FIG. 3 is a cross-sectional side view of the cap according to the invention taken on Line 3—3 of FIG. 2.

Now, with more particular reference to the drawings, the combination cap is shown generally at 10 and has the first end 11 which is a hollow generally cylindrical body part which can be adapted to engage the threads of a threaded container, and the second end 12 which is a hollow generally cylindrical body part which can be adapted to engage snap-on cap type containers. The combination cap 10 also has the intermediate web 13, which is disposed generally between the first end 11 and the second end 12. The intermediate web 13 is generally flat on its sides and is generally cylindrical around its outer edge which forms the perimeter of the combination cap. The threads 14 of the first end 11 are of a suitable size and shape to engage the threads of a container. The ridge 21 is raised in the surface of the intermediate web 13 facing the threads 14. The ridge 21 forms a seal around the end of the neck of the engaged container when the cap is seated thereon. The inner diameter of the first end 11, having the threads 14, is generally vertical axially to the cap to conform to the shape of the container to be capped. The outer diameter of the first end 11 can be tapered from a maximum diameter at the end adjacent the intermediate web 13 to a minimum diameter at its outer edge 16. The first end 11 may also have a plurality of raised rib portions 19 which provides a convenient grip for hands when the cap is being threaded on or off of a container.

The second end 12 can be adapted to fit over snap-on type containers. The second end 12 projects from one side of the disk-shaped, intermediate web 13 and is generally concentric to the intermediate web and will have a generally cylindrical outer surface extending concentrically relative to the center line of the cap. The inner diameter of the second end 12 has a maximum diameter at the end adjacent the intermediate web 13 and has a gradually decreasing diameter to a point 15 where the inner surface of 12 curves outwardly to the outer edge 17. The curve from the point 15 to the outer edge 17 will serve to center the cap over a container as it is being capped. The cap 10 will also have a tab 18 which is located along the edge of the intermediate web 13. The tab 18 provides a gripping point for use in disengaging the cap 10 from a container. The tab 18 may have gussets 20 which will reinforce and strengthen the tab 18.

The combination cap may be made of any suitable resilient plastic material by injection molding or other methods well known to those skilled in the art.

The foregoing specification sets forth the invention in its preferred, practical forms but the structure shown is capable of modification within a range of equivalents without departing from the invention which is to be understood is broadly novel as is commensurate with the appended claims.

The embodiments of the invention in which an exclusive property or privilege is claimed are defined as follows:

1. A combination cap to recap a container from which a non-reusable cap has been removed comprising,
   a generally cylindrical hollow body having,
   a first end having a generally cylindrical inner surface defining a first cup-shaped space and a second end having a general frusto-conical inner surface tapering inwardly toward its open end and defining a second cup-shaped space therein,
   said first end and said second end adjacent said first end having substantially the same diameter,
   an intermediate web in the form of a relatively thin, circular disk integrally attached at its outer periphery to the inner periphery of said inner surfaces and disposed between said first end and said second end forming a partition between said cup-shaped spaces,
   said first end having internal threads thereon for engaging the threaded top of a threaded container,
   said second end being adapted to receive an end of a snap-on type container,
   the inner surface of said second end tapering inwardly from said intermediate web toward an outer edge of said second end in the shape of the frustum of a cone to a position adjacent said outer edge then curving outwardly toward said outer edge,
   an annular radially-extending shoulder on said cap,
   said shoulder being disposed in a plane substantially co-extensive with the side of said web adjacent said second end,
   the outer surface of said cap tapering inwardly from said shoulder toward an outer edge of said first end and terminating at said outer edge and having a first outside surface formed generally in the shape of a frustum of a cone, the outer surface of said cap between said shoulder and said outer edge of said second end being in the shape of a cylinder, a tab integrally attached to said cap and extending radially outwardly therefrom, said tab having a flat surface forming a continuation of said shoulder and two spaced gussets attached to said outer surface adjacent said second end and attached to the surface of said shoulder and said surface of said tab forming a continuation of said shoulder to a position spaced inwardly from the outside edge of said tab, and circumferentially-spaced, axially-extending ribs on said first outer surface.

* * * * *